(12) United States Patent
Wu et al.

(10) Patent No.: US 11,107,256 B2
(45) Date of Patent: Aug. 31, 2021

(54) VIDEO FRAME PROCESSING METHOD AND APPARATUS

(71) Applicant: BEIJING BYTEDANCE NETWORK TECHNOLOGY CO., LTD., Beijing (CN)

(72) Inventors: Xinglong Wu, Beijing (CN); Guozhong Luo, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/020,420

(22) Filed: Sep. 14, 2020

(65) Prior Publication Data

US 2021/0065406 A1    Mar. 4, 2021

Related U.S. Application Data

(63) Continuation of application No. PCT/CN2018/116341, filed on Nov. 20, 2018.

(30) Foreign Application Priority Data

Aug. 7, 2018  (CN) .......................... 201810888878.1

(51) Int. Cl.
*G06T 11/00* (2006.01)
*G06T 7/73* (2017.01)
(Continued)

(52) U.S. Cl.
CPC .......... *G06T 11/00* (2013.01); *G06K 9/00375* (2013.01); *G06K 9/00744* (2013.01);
(Continued)

(58) Field of Classification Search
CPC . G06T 11/00; G06T 7/73; G06T 2207/10016; G06T 2207/30196;
(Continued)

(56) References Cited

U.S. PATENT DOCUMENTS

2014/0168074 A1    6/2014 Lim et al.
2014/0317656 A1    10/2014 Schwab et al.
(Continued)

FOREIGN PATENT DOCUMENTS

CN    104424585 A    3/2015
CN    104469179 A    3/2015
(Continued)

OTHER PUBLICATIONS

International Patent Application No. PCT/CN2018/116341; Int'l Search Report; dated May 7, 2019; 3 pages.

*Primary Examiner* — Jon Chang
(74) *Attorney, Agent, or Firm* — BakerHostetler (57) ABSTRACT

Disclosed in the embodiments of the present application are a video frame processing method and apparatus. An embodiment of the method comprises: acquiring a video frame containing a hand, and detecting key points of the hand contained in the video frame; generating a special effect of the hand on the basis of the key points; and displaying the generated special effect in an image of the video frame.

15 Claims, 4 Drawing Sheets

(51) Int. Cl.
  *G06K 9/00* (2006.01)
  *H04N 21/44* (2011.01)
(52) U.S. Cl.
  CPC ......... *G06T 7/73* (2017.01); *H04N 21/44008* (2013.01); *G06T 2207/10016* (2013.01); *G06T 2207/30196* (2013.01)
(58) Field of Classification Search
  CPC ........... G06K 9/00744; G06K 9/00375; H04N 21/44008; H04N 21/44012; H04N 5/262; H04N 21/44; G11B 27/031
  See application file for complete search history.

(56) References Cited

U.S. PATENT DOCUMENTS

2020/0285858 A1\* 9/2020 Xu ..................... G06K 9/00335
2020/0387698 A1\* 12/2020 Yi ........................... G06T 7/174

FOREIGN PATENT DOCUMENTS

| CN | 104780458 A | 7/2015 |
| CN | 106096062 A | 11/2016 |
| CN | 107343211 A | 11/2017 |
| CN | 107635104 A | 1/2018 |
| CN | 108259496 A | 7/2018 |
| CN | 108289180 A | 7/2018 |
| CN | 108345387 A | 7/2018 |

\* cited by examiner

VIDEO FRAME PROCESSING METHOD AND APPARATUS

The present patent application is a continuation of International Patent Application No. PCT/CN2018/116341 filed on Nov. 20, 2018, which claims priority to Chinese Patent Application No. 201810888878.1, titled "VIDEO FRAME PROCESSING METHOD AND APPARATUS", filed on Aug. 7, 2018 with the Chinese Patent Office by Beijing ByteDance Network Technology Co., Ltd., both of which are incorporated herein by reference in their entireties.

FIELD

Embodiments of the present disclosure relate to the field of computer technologies, particularly to the field of interne technologies, and more particularly to a method and an apparatus for processing a video frame.

BACKGROUND

With the development of image processing technologies, it has become more and more common to retouch or decorate images. Various effects can be added to the face in the image to make the face in the image more vivid. At a position other than the face in the image, the effect is often simple.

SUMMARY

A method and an apparatus for processing a video frame are provided according to embodiments of the present disclosure.

In a first aspect, a method for processing a video frame is provided according to embodiments of the present disclosure. The method includes: acquiring a video frame containing a human hand, and detecting key points of the human hand contained in the video frame; generating a special effect of the human hand based on the key points; and displaying the generated special effect in a picture of the video frame.

In a second aspect, an electronic apparatus is provided according to an embodiment of the present disclosure. The electronic apparatus includes: one or more processors and at least one memory for storing one or more programs. When executed by the one or more processors, the one or more programs cause the one or more processors to implement the method for processing a video frame described above.

In a third aspect, a computer-readable storage medium having a computer program stored thereon is provided according to an embodiment of the present disclosure. The program is executed by a processor to implement the method for processing a video frame described above.

BRIEF DESCRIPTION OF THE DRAWINGS

Other features, objectives and advantages of the present disclosure will become clearer by reading the detailed description of non-restrictive embodiments with reference to the drawings.

DETAILED DESCRIPTION OF EMBODIMENTS

The present disclosure is described in detail below through embodiments with reference to the drawings. It should be understood that the specific embodiments described herein are used to only explain the present disclosure, rather than limiting the present disclosure. It should further be noted that, the drawings only show parts related to the present disclosure for a brief description.

It should be noted that, embodiments of the present disclosure and features in the embodiments may be combined with each other as long as there is no conflict. The present disclosure is described in detail below through embodiments with reference to the drawings.

In the video frame processing solutions according to the embodiments of the present disclosure, firstly, a video frame containing a human hand is acquired, and key points of the human hand contained in the video frame are detected. Next, a special effect of the human hand is generated based on the key points, and the special effect is displayed in a picture of the video frame. According to the embodiments of the present disclosure, the special effect of the hand can be generated and is displayed in the picture of the video frame in the process of video playing, enriching the effect of the human hand in the video frame, and enhancing expressiveness of the human hand in the video frame.

Figure 1:
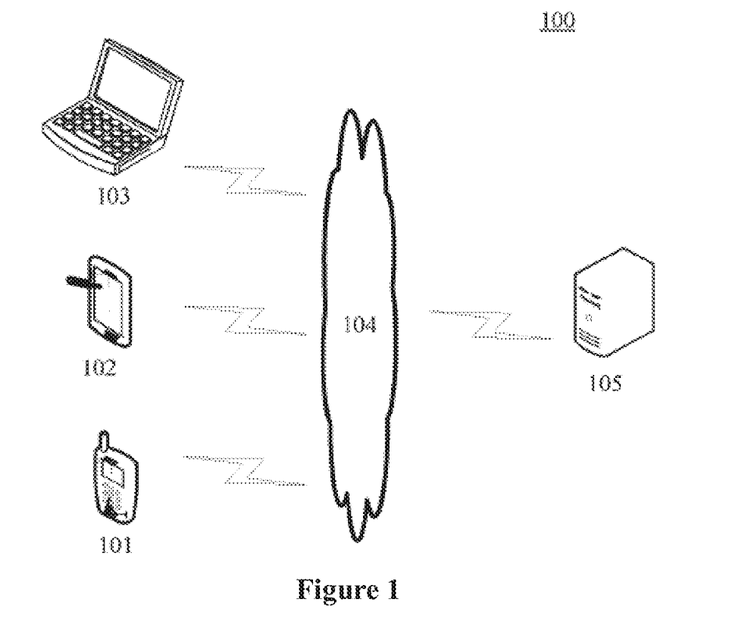
FIG. 1 is a schematic diagram showing a system architecture to which the present disclosure is applied.

FIG. 1 schematically shows a system architecture 100 to which a method or an apparatus for processing a video frame according to an embodiment of the present disclosure may be applied.

As shown in FIG. 1, the system architecture 100 may include terminal apparatuses 101, 102 and 103, a network 104, and a server 105. The network 104 is a medium used to provide a communication link between the terminal apparatuses 101, 102, 103 and the server 105. The network 104 may be implemented by various types of connections, such as a wired communication link, a wireless communication link, or an optical fiber cable.

A user may use the terminal apparatuses 101, 102 and 103 to interact with the server 105 via the network 104, to receive or transmit a message. Various communication client applications, such as image processing applications, video applications, live broadcast applications, instant messaging tools, email clients, and social platform software, may be installed on the terminal apparatuses 101, 102 and 103.

Each of the terminal apparatuses 101, 102 and 103 herein may be implemented by hardware or software. In the case of being implemented by hardware, the terminal apparatuses 101, 102 and 103 may be various electronic apparatuses having display screens. The various electronic apparatuses may include but are not limited to a smartphone, a tablet computer, an e-book reader, a laptop computer, a desk computer and the like. In a case of being implemented by software, the terminal apparatuses 101, 102 and 103 may be installed on the above electronic apparatuses. The terminal apparatuses 101, 102 and 103 may be implemented by multiple software or software modules (for example, software or software modules for providing distributed services), or may be implemented by single software or software module, which is not limited herein.

The server 105 may be a server for providing various services, such as a background server for providing support to the terminal apparatuses 101, 102 and 103. The background server may analyze and process data such as a received image, and feedback a processing result (for example, a video frame containing a special effect) to the terminal apparatus.

It should be noted that, the method for processing a video frame according to the embodiment of the present disclosure may be performed by the server 105 or the terminal apparatuses 101, 102 and 103. Accordingly, the apparatus for processing a video frame may be arranged in the server 105 or the terminal apparatuses 101, 102 and 103.

It should be understood that, FIG. 1 only shows illustrative numbers of the terminal apparatuses, the network, and the server. Based on actual demands, there may be any numbers of the terminal apparatuses, the network, and the server.

Figure 2:
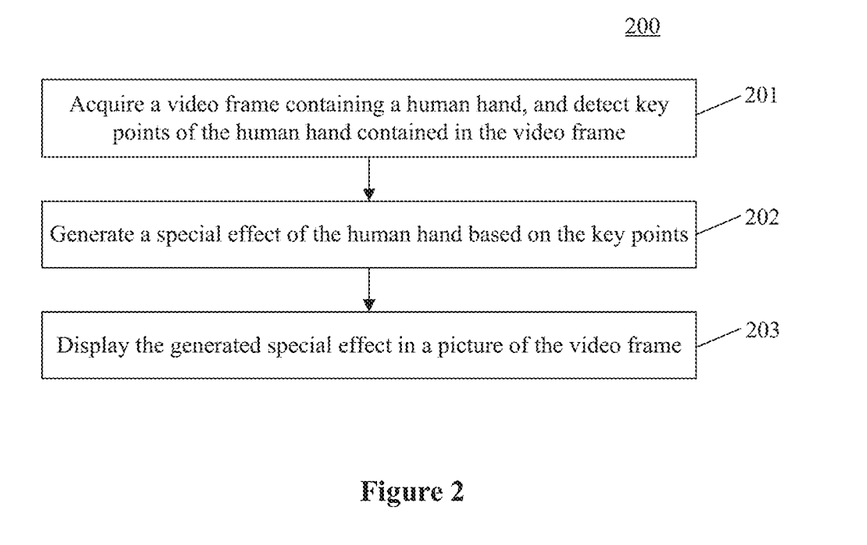
FIG. 2 is a flowchart of a method for processing a video frame according to an embodiment of the present disclosure.

Reference is made to FIG. 2, which shows a flow 200 of a method for processing a video frame according to an embodiment of the present disclosure. The method for processing a video frame includes the following steps 201 to 204.

In step 201, a video frame containing a human hand is acquired, and key points of the human hand contained in the video frame are detected.

In this embodiment, an execution subject (for example, the server or one of the terminal apparatuses shown in FIG. 1) of the method for processing a video frame may acquire the video frame containing the human hand in the process of video playing. Further, the execution subject may detect the key points of the human hand contained in the video frame. Information of the key point may include position information of the key point. In addition, the information of the key point may further include feature information of the key point, for example, color information of the key point. For example, the information of the key point may be a feature vector.

In some optional implementations of this embodiment, the process of acquiring a video frame containing a human hand in step 201 may be performed by: acquiring a video frame, and performing human hand detection on the video frame to determine whether an image contains a human hand; and in response to determining that the video frame contains a human hand, determining the video frame as a video frame containing a human hand.

In these optional implementations, the execution subject of the method for processing a video frame may acquire the video frame in the video, and perform human hand detection on the video frame. By the human hand detection, whether the video frame contains a human hand can be determined. If a result of the human hand detection is that the video frame contains a human hand, the video frame is regarded as a video frame containing a human hand.

In these implementations, whether a video frame contains a human hand can be accurately determined through the human hand detection.

In step 202, a special effect of the human hand is generated based on the key points.

In this embodiment, the execution subject may generate the special effect of the human hand based on the key points after detecting the key points. Specifically, the special effect may include various shapes of patterns that can be presented in the video frame, such as lightning, dark clouds, light beams, or water jets. The special effect of the human hand herein may specifically be a special effect displayed at a position of the human hand, around the human hand, and/or between the human hands, and the like.

In practice, the execution subject may generate the special effect of the human hand based on the key points in various manners. For example, the execution subject may acquire a predetermined special effect template, and generate the special effect of the human hand by taking the key point as a center point of the special effect. In addition, the execution subject may also display a preset special effect pattern at each detected key point.

In step 203, the generated special effect is displayed in a picture of the video frame.

In this embodiment, the execution subject may display the generated special effect in the picture of the video frame. In the process of video playing, the special effect may be displayed in a certain video frame in real time when the video frame is played.

Figure 3:
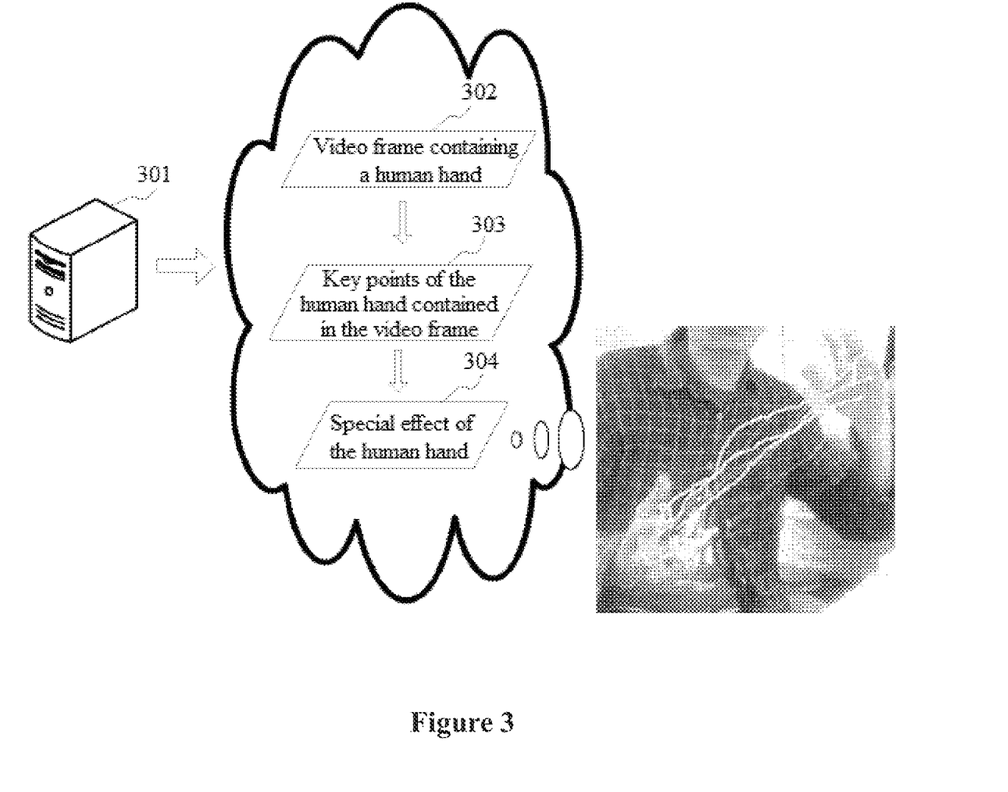
FIG. 3 is a schematic diagram showing an application scenario of a method for processing a video frame provided in the present disclosure.

Reference is made to FIG. 3, which is a schematic diagram showing an application scenario of the method for processing a video frame according to this embodiment. In the application scenario shown in FIG. 3, an execution subject 301 may acquire a video frame 302 containing a human hand, and detect key points 303 of the human hand contained in the video frame 302; generate a special effect 304 of the human hand based on the key points 303; and display the generated special effect 304 in a picture of the video frame.

In this embodiment, the special effect of the hand can be generated and is displayed in the picture of the video frame in the process of video playing, enriching the effect of the human hand in the video frame, and enhancing expressiveness of the human hand in the video frame.

Figure 4A:
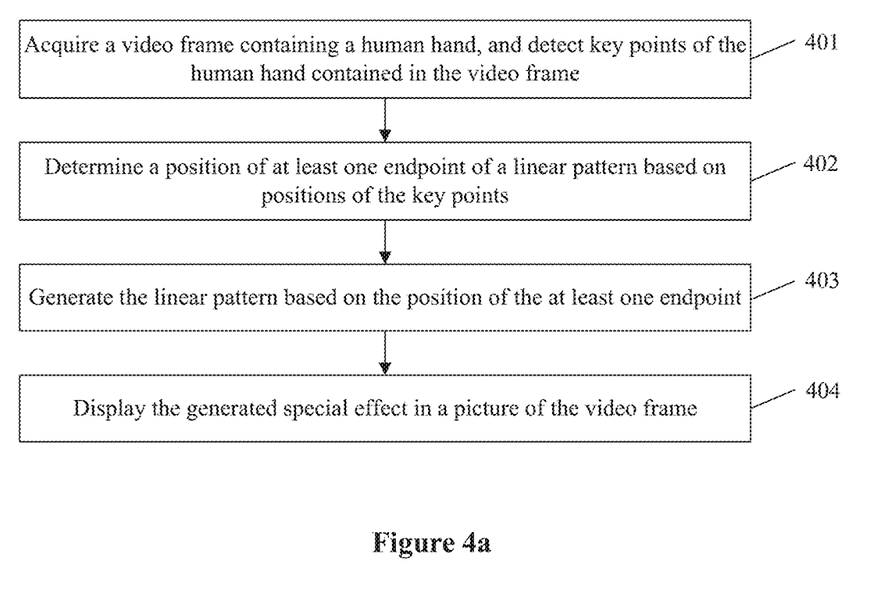
FIG. 4*a* is a flowchart of a method for processing a video frame according to another embodiment of the present disclosure.

Reference is made to FIG. 4a, which shows a flow 400 of a method for processing a video frame according to another embodiment. The flow 400 of the method for processing a video frame includes the following steps 401 to 404.

In step 401, a video frame containing a human hand is acquired, and key points of the human hand contained in the video frame are detected.

In this embodiment, an execution subject (for example, the server or one of the terminal apparatuses shown in FIG. 1) of the method for processing a video frame may acquire the video frame containing the human hand. Further, the execution subject may detect the key points of the human hand contained in the video frame. Information of the key point may include position information of the key point, and may further include feature information of the key point.

In step 402, based on positions of the key points, a position of at least one endpoint of the linear pattern is determined.

In this embodiment, the special effect may include a linear pattern. The execution subject may determine the position of the at least one endpoint of the linear pattern based on the positions of the key points. The linear pattern herein generally has two endpoints. The position of at least one of the endpoints may be determined based on the key points. Specifically, the position of the at least one endpoint may be determined in multiple manners. For example, the position of the key point may be taken as the endpoint of the linear pattern. In addition, a coordinate that is within a certain threshold from a coordinate of the key point may be determined as a coordinate of the endpoint. For example, taking the key point being as a center, a position within 3 from horizontal and vertical coordinates of the key point is determined as the position of the at least one endpoint. Specifically, the linear pattern is a slender pattern, which may be straight, curved, turned, or branched.

In step 403, based on the position of the at least one endpoint, the linear pattern is generated.

Figure 4B:
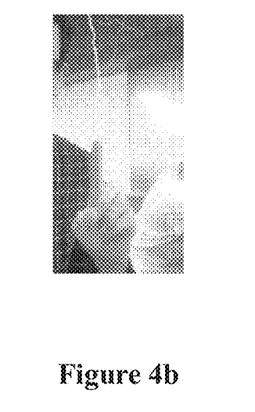
FIG. 4*b* is a schematic diagram showing a linear pattern in FIG. 4*a*.

In this embodiment, the execution subject may generate the linear pattern based on the position of the at least one endpoint. The linear pattern may be determined in various manners. For example, a template of the linear pattern is determined, and there may be one or more templates. One of the templates may be selected randomly or by priority. The linear pattern with an endpoint being the at least one endpoint and corresponding to the selected template may be displayed. If only one endpoint is determined, the linear pattern corresponding to the template may be generated according to a predetermined pattern display direction. If two endpoints are determined, the two endpoints may directly correspond to two endpoints of the template. As shown in FIG. 4b, a linear pattern is shown.

In some optional implementations of this embodiment, step 402 may include: determining, in response to determining that one finger of the human hand points to preset pointing, a position of one endpoint of a trunk line of the linear pattern based on a position of a fingertip key point of the finger.

In these implementations, the execution subject may determine, in the case of determining that one finger of the human hand contained in the video frame points to the preset pointing, the position of the one endpoint of the trunk line of the linear pattern based on the position of the fingertip key point of the finger. Specifically, the preset pointing may be any pointing, for example, upward or leftward. A direction of the pointing herein is allowed to have a certain error. For example, the upward pointing is allowed to have an error of 10 degrees to the left or right.

In some optional application scenarios of these implementations, step 403 may include: generating the trunk line based on the position of the one endpoint. A difference between a direction of the trunk line and a direction of the preset pointing is in a preset angle range.

In these optional application scenarios, the linear pattern may include the trunk line. The execution subject may generate the trunk line of the linear pattern based on the position of the one endpoint. The trunk line may reflect the preset pointing and is consistent with the preset pointing.

In some optional cases of these application scenarios, step 403 may include: generate an additional line with at least one endpoint in the trunk line.

In these optional cases, the execution subject may generate the additional line. Specifically, the additional line may have only one endpoint in the trunk line, or two endpoints both in the trunk line. The additional line may be a branch of the trunk line. For example, the linear pattern may be a tree, the trunk line may be a trunk of the tree, and the additional line may be a tree branch next to the trunk. Generally, a line width of the trunk line may be greater than that of the additional line.

In these implementations, the linear pattern having an abundant level may be generated by using the trunk line and the additional line. Based on the positions of the key points of the human hand, the linear pattern is accurately determined.

In some optional application scenarios of these implementations, the determining, in response to determining that one finger of the human hand points to preset pointing, a position of one endpoint of a trunk line of the linear pattern based on a position of a fingertip key point of the finger includes:

determining, in response to determining that one finger of the human hand points to preset pointing, whether the finger is bent; and determining, in response to determining that the finger is not bent, a position of one endpoint of a trunk line of the linear pattern based on a position of a fingertip key point of the finger.

In these optional application scenarios, the execution subject may determine, in the case of determining that one finger of the human hand points to the preset pointing, whether the finger is bent. Specifically, whether the finger is bent may be determined based on the positions of the detected key points. For example, a key point a is a fingertip key point of an index finger, and a key point b is a finger-root key point of the index finger. If a distance between a position of the key point a and a position of the key point b is less than a preset threshold X, it may be determined that the finger is bent. If the distance between the position of the key point a and the position of the key point b is not less than the preset threshold X, it may be determined that the finger is not bent. Further, in addition to the key point a and the key point b, a key point c at a knuckle mainly involved when the index finger is bent may be detected. If an angle acb with the key point c as a vertex is less than 120°, it may be determined that the finger is bent. If the angle is not less than 120°, it may be determined that the finger is not bent.

In some optional implementations of this embodiment, the linear pattern includes a target line, and step 402 may include:

selecting, in response to determining that the video frame contains two human hands, a target key point from key points of each of the two human hands, and determining a position of a target endpoint of the target line based on a position of the selected target key point.

In these optional implementations, the execution subject may generate one or more target lines between the two human hands. The target key point may be selected from the key points of each of the two human hands. One endpoint, i.e., the target endpoint, of the target line is generated based on each target key point.

In practice, the target key point may be randomly selected from multiple key points of each human hand. In addition, the target key point with high priority may be determined from the multiple key points according to a preset priority.

Specifically, the position of the target endpoint may be determined in various manners. The position of the target key point may be taken as the endpoint of the linear pattern. In addition, a coordinate that is within a certain threshold from a coordinate of the target key point may be determined as a coordinate of the target endpoint.

In some optional application scenarios of these implementations, step 403 may include:

generating a target line whose endpoint is the target endpoint according to the position of the target endpoint, where the target line is located in an area between the two human hands.

In these optional application scenarios, the execution subject may generate the target line using the determined position of the target endpoint, where an endpoint of the target line is the target endpoint. A target endpoint is determined according to one target key point of each of the two human hands, and thus two target endpoints respectively corresponding to the two human hands are acquired. The two target endpoints are two endpoints of the target line. As a special effect, the target line may be presented as lightning, noodles, water jets, or the like. The target line generated based on the key points between the two human hands is located in the area between the two human hands in the video frame.

In some optional cases of these application scenarios, the number of the target line is at least two, and the at least two target lines intersect each other.

In these optional cases, the number of the target lines is at least two. There is at least one intersection between the target lines to enhance the simulation effect of the special effect.

In some optional application scenarios of these implementations, the selecting, in response to determining that the video frame contains two human hands, a target key point from key points of each of the two human hands may include:
in response to determining that no finger points to preset pointing, selecting a target key point from multiple key points of each of two human hands if it is determined that the video frame contains the two human hands.

In these optional application scenarios, the execution subject may determine whether the human hand contained in the video frame has a finger pointing to preset pointing. If no finger points the preset pointing, the execution subject may determine whether the video frame contains two human hands. If the video frame contains the two human hands, the execution subject may select a target key point from multiple key points of each human hand.

In some optional application scenarios of these implementations, the selecting, in response to determining that the video frame contains two human hands, a target key point from key points of each of the two human hands may include:
determining, in response to determining that there is one finger pointing to preset pointing, whether the finger pointing to the preset pointing is bent; and
in response to determining that the finger pointing to the preset pointing is bent, selecting a target key point from multiple key points of each of two human hands if it is determined that the video frame contains the two human hands.

In these application scenarios, in the case that there is one finger pointing to the preset pointing, if it is determined that the finger is bent and the video frame contains two human hands, the target key point may be selected from multiple key points of each human hand.

By these implementations, a target line can be generated between the two human hands, so that the two human hands in the picture can have an interactive effect, enriching the special effect.

In step 404, the generated special effect is displayed in a picture of the video frame.

In this embodiment, the execution subject may display the generated special effect in the picture of the video frame. In the process of video playing, the special effect may be displayed in a certain video frame in real time when the video frame is played.

According to this embodiment, the special effect of one hand and/or the special effect of two human hands can be displayed in the picture of the video frame, thereby accurately and richly presenting a variety of special effects in the video frame.

Figure 5:
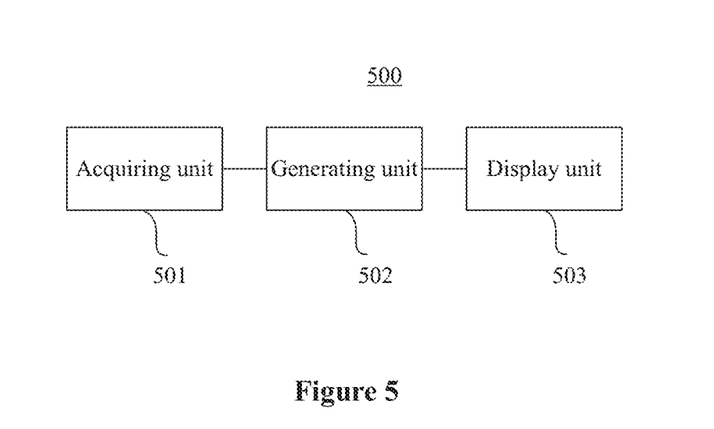
FIG. 5 is a schematic structural diagram of an apparatus for processing a video frame according to an embodiment of the present disclosure.

Referring to FIG. 5, an apparatus for processing a video frame is provided according to an embodiment of the present disclosure, to implement the method shown in the drawings. The apparatus embodiment corresponds to the method embodiment shown in FIG. 2. The apparatus may be used in various electronic apparatuses.

As shown in FIG. 5, an apparatus 500 for processing a video frame according to this embodiment includes: an acquiring unit 501, a generating unit 502 and a displaying unit 503. The acquiring unit 501 is configured to: acquire a video frame containing a human hand, and detect key points of the human hand contained in the video frame. The generating unit 502 is configured to generate a special effect of the human hand based on the key points. The display unit 503 is configured to display the special effect in a picture of the video frame.

In some embodiments, the acquiring unit 501 may acquire the video frame containing the human hand in the process of video playing. Further, the execution subject may detect the key points of the human hand contained in the video frame. Information of the key point may include position information of the key point. In addition, the information of the key point may further include feature information of the key point, for example, color information of the key point. For example, the information of the key point may be a feature vector.

In some embodiments, the generating unit 502 may generate the special effect of the human hand based on the key points after detecting the key points. Specifically, the special effect may include various shapes of patterns that can be presented in the video frame, such as lightning, dark clouds, light beams, or water jets. The special effect of the human hand herein may specifically be a special effect displayed at a position of the human hand, around the human hand, and/or between the human hands, and the like.

In some embodiments, the generated special effect may be displayed in the picture of the video frame. In the process of video playing, the special effect may be displayed in a certain video frame in real time when the video frame is played.

In some optional implementations of this embodiment, the generated special effect includes a linear pattern. The generating unit includes a determining module and a generating module. The determining module is configured to determine a position of at least one endpoint of the linear pattern based on positions of the key points. The generating module is configured to generate the linear pattern based on the position of the at least one endpoint.

In some optional implementations of this embodiment, the determining module includes a determining sub-module. The determining sub-module is configured to in response to determining that one finger of the human hand points to preset pointing, determine a position of one endpoint of a trunk line of the linear pattern based on a position of a fingertip key point of the finger. The generating module includes a trunk generating sub-module. The trunk generating sub-module is configured to generate the trunk line based on the position of the one endpoint. A difference between a direction of the trunk line and a direction of the preset pointing is in a preset angle range.

In some optional implementations of this embodiment, the generating module further includes an additional generating module. The additional generating module is configured to generate an additional line with at least one endpoint located in the trunk line.

In some optional implementations of this embodiment, the determining sub-module is further configured to: in response to determining that one finger of the human hand points to preset pointing, determine whether the finger is bent; and in response to determining that the finger is not bent, determine a position of one endpoint of a trunk line of the linear pattern based on a position of a fingertip key point of the finger.

In some optional implementations of this embodiment, the linear pattern includes a target line. The determining module includes a determining sub-module. The determining sub-module is configured to in response to determining that the video frame contains two human hands, select a target key point from key points of each of the two human hands, and determine a position of a target endpoint of the target line based on a position of the selected target key point. The generating module includes a generating sub-module. The generating sub-module is configured to generate a target line whose endpoint is the target endpoint according to the position of the target endpoint. The target line is located in an area between the two human hands.

In some optional implementations of this embodiment, the number of the target line is at least two, and the at least two target lines intersect each other.

In some optional implementations of this embodiment, the determining sub-module is further configured to: in response to determining that no finger points to preset pointing, select a target key point from multiple key points of each of two human hands if it is determined that the video frame contains the two human hands.

In some optional implementations of this embodiment, the determining sub-module is further configured to: in response to determining that there is one finger pointing to preset pointing, determine whether the finger pointing to the preset pointing is bent; and in response to determining that the finger pointing to the preset pointing is bent, select a target key point from multiple key points of each of two human hands if it is determined that the video frame contains the two human hands.

Figure 6:
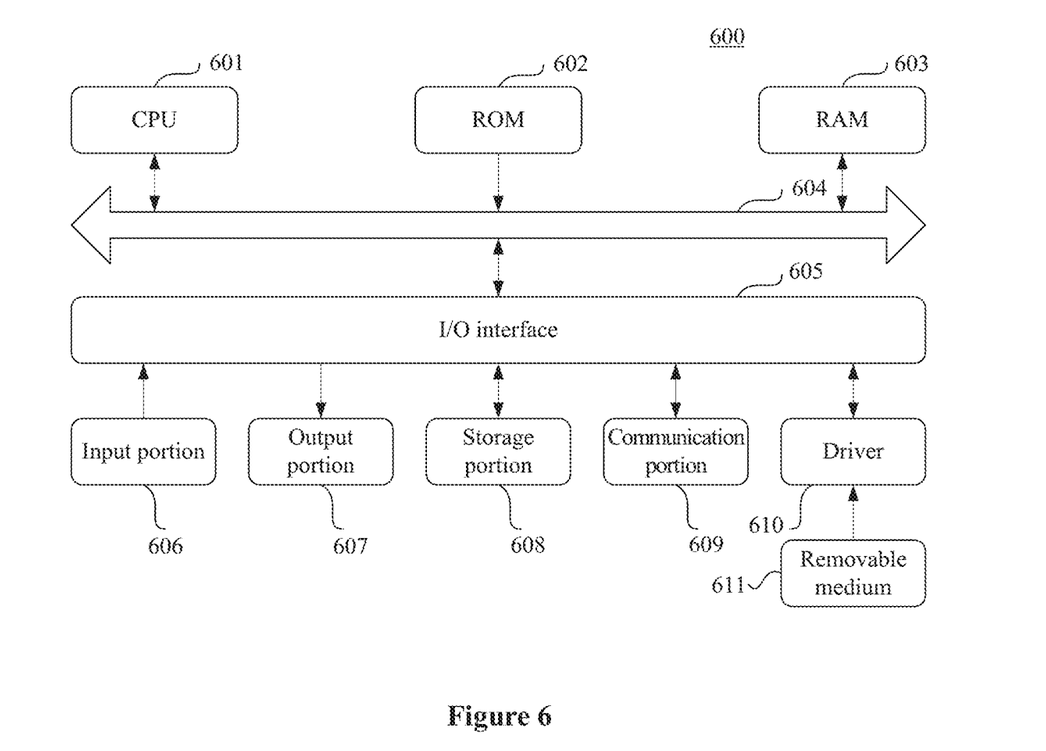
FIG. 6 is a schematic structural diagram of a computer system applicable to implement an electronic apparatus according to an embodiment of the present disclosure.

Reference is made to FIG. 6, which is a schematic structural diagram of a computer system 600 applicable to implement an electronic apparatus according to an embodiment of the present disclosure. The electronic apparatus shown in FIG. 6 is provided only for illustration rather than limitation to functions and applications of the embodiments of the present disclosure.

As shown in FIG. 6, the computer system 600 includes a central processing unit (CPU) 601. The CPU 601 may perform various proper operations and processing based on programs stored in a read-only memory (ROM) 602 or programs loaded from a storage portion 608 to a random-access memory (RAM) 603. The RAM 603 also stores various data and programs required for operations of the system 600. The CPU 601, the ROM 602, and the RAM 603 are connected to each other via a bus 604. An input/output (I/O) interface 605 is also connected to the bus 604.

The following components are connected to the I/O interface 605: an input portion 606 including a keyboard, a mouse or the like, an output portion 607 including a cathode ray tube (CRT), a liquid crystal display (LCD), a speaker or the like, a storage portion 608 including a hard disk or the like, and a communication portion 609 including a network interface card such as a LAN card and a modem. The communication portion 609 performs communication processing via a network such as the Internet. If necessary, a driver 610 may also be connected to the I/O interface 605. A removable medium 611 such as a magnetic disk, an optical disk, a magneto-optical disk and a semiconductor memory is mounted on the driver 610 as necessary, such that a computer program read from the removable medium 611 is installed in the storage portion 608.

According to the embodiments of the present disclosure, the above processes described with reference to the flowcharts may be implemented as computer software programs. For example, a computer program product is provided according to an embodiment of the present disclosure. The computer program product includes a computer program carried by a computer readable medium. The computer program includes program codes for performing the method shown in the flowcharts. In this embodiment, the computer program may be downloaded and installed from Internet via the communication portion 609, and/or may be installed from the removable medium 611. The computer program, when being executed by the central processing unit (CPU) 601, can realize the above functions specified in the method in the present disclosure. It should be noted that, the computer readable medium in the present disclosure may be a computer readable signal medium, a computer readable storage medium, or any combination thereof. The computer readable storage medium may be but is not limited to a system, apparatus, or apparatus in an electronic, magnetic, optical, electromagnetic, infrared, or semi-conductive form, or any combination thereof. Specifically, the computer readable storage medium may be but is not limited to an electric connection having one or more wires, a portable computer disk, a hard disk, a random-access memory (RAM), a read-only memory (ROM), an erasable programmable read-only memory (EPROM or a flash memory), an optical fiber, a portable compact disc read-only memory (CD-ROM), a light storage apparatus, a magnetic storage apparatus or any combination thereof. In the present disclosure, the computer readable storage medium may be any tangible medium including or storing a program. The program may be used by or with a command execution system, apparatus or apparatus. In the present disclosure, the computer readable signal medium may be a data signal transmitted in a baseband or transmitted as a part of a carrier wave, where the data signal carries computer readable program codes. The transmitted data signal may be in various forms, including but not limited to an electromagnetic signal, an optical signal or any proper combination thereof. The computer readable signal medium may further be any computer readable medium. The computer readable medium can send, transmit or transfer the program that is used by or with a command execution system, apparatus or apparatus. Program codes stored in the computer readable medium may be transmitted via any proper medium including but not limited to wireless, wired, an optical cable, RF and the like, or any proper combination thereof.

The flowcharts and the block diagrams illustrate system structures, functions and operations that may be implemented with the system, the method, and the computer program product according to the embodiments of the present disclosure. In this case, each block in the flowcharts or the block diagrams may represent a module, a program segment, or a part of codes. The module, the program segment, or the part of codes may include one or more executable instructions for implementing a specified logical function. It should be noted that, in some alternative implementations, the functions shown in blocks may be performed in an order different from that indicated in the drawings. For example, steps shown in two adjacent blocks may be performed almost in parallel, or may be performed in reverse order, which is determined based on the functions. It should be further noted that, a function shown in each block of the flowcharts and/or block diagrams, or shown in a combination of blocks of the flowcharts and/or block diagrams may be implemented by a hardware-based system dedicated for performing specified functions or operations, or may be implemented by a combination of a dedicated hardware and computer instructions.

The units involved in the embodiments of the present disclosure may be implemented by hardware or software. The units may also be arranged in a processor. For example, it may be described as a processor including an acquiring unit, a generating unit and a display unit. In some cases, names of the units are not intended to limit the units. For example, the acquiring unit may be described as a unit for acquiring a video frame containing a human hand.

In another aspect, a computer readable medium is further provided in the present disclosure. The computer readable medium may be included in the apparatus as described in the above, or may be separated from the apparatus. The computer readable medium carries one or more programs. The one or more programs, when being executed by the apparatus, can cause the apparatus to perform the steps of: acquiring a video frame containing a human hand, and detecting key points of the human hand contained in the video frame; generating a special effect of the human hand based on the key points; and displaying the generated special effect in a picture of the video frame.

The above describes only preferred embodiments and technical principles used in the present disclosure. It should be understood by those skilled in the art that, the scope of the present disclosure is not limited to the technical solutions formed by the specific combinations of the above technical features, and should further cover other technical solutions formed by any combination of the above technical features or equivalent features of the above technical features without departing from the above concept, for example, technical solutions formed by interchanging the above features and the technical features having the similar functions as described (but not limited to those) in the present disclosure.

The invention claimed is:

1. A method for processing a video frame, the method comprising:
    acquiring a video frame containing a human hand, and detecting key points of the human hand contained in the video frame;
    generating a special effect of the human hand based on the key points, wherein the special effect comprises a linear pattern, and wherein the generating a special effect of the human hand based on the key points further comprises:
        determining a position of at least one endpoint of the linear pattern based on positions of the key points,
        generating the linear pattern based on the position of the at least one endpoint,
        wherein the determining a position of at least one endpoint of the linear pattern based on positions of the key points further comprises: determining, in response to a determination that one finger of the human hand points to a preset directions, a position of one endpoint of a trunk line of the linear pattern based on a position of a fingerprint key point of the finger, and
        wherein the generating the linear pattern based on the position of the at least one endpoint further comprises: generating the trunk line based on the position of the one endpoint, wherein a difference between a direction of the trunk line and the preset direction is in a preset angle range; and
    displaying the generated special effect in a picture of the video frame.

2. The method according to claim 1, wherein the generating the linear pattern based on the position of the at least one endpoint further comprises:
    generating an additional line with at least one endpoint located in the trunk line.

3. The method according to claim 1, wherein the determining, in response to a determination that one finger of the human hand points to a preset direction, a position of one endpoint of a trunk line of the linear pattern based on a position of a fingertip key point of the finger further comprises:
    determining, in response to the determination that one finger of the human hand points to the preset direction, whether the finger is bent; and
    determining, in response to a determination that the finger is not bent, a position of one endpoint of a trunk line of the linear pattern based on a position of a fingertip key point of the finger.

4. The method according to claim 1, wherein the linear pattern comprises at least one target line;
    the determining a position of at least one endpoint of the linear pattern based on positions of the key points comprises: selecting, in response to a determination that the video frame contains two human hands, a target key point from key points of each of the two human hands, and determining a position of a target endpoint of the at least one target line based on a position of the selected target key point; and
    the generating the linear pattern based on the position of the at least one endpoint comprises: generating the at least one target line whose endpoint is the target endpoint according to the position of the target endpoint, wherein the at least one target line is located in an area between the two human hands.

5. The method according to claim 4, wherein the at least one target line comprises a plurality of target lines, and the plurality of target lines intersect each other.

6. The method according to claim 4, wherein the selecting, in response to a determination that the video frame contains two human hands, a target key point from key points of each of the two human hands further comprises:
    in response to a determination that no finger points to a preset direction, selecting a target key point from a plurality of key points of each of two human hands if it is determined that the video frame contains the two human hands.

7. The method according to claim 4, wherein the selecting, in response to a determination that the video frame contains two human hands, a target key point from key points of each of the two human hands further comprises:
    determining, in response to a determination that there is one finger pointing to a preset direction, whether the finger pointing to the preset direction is bent; and
    in response to determining that the finger pointing to the preset direction is bent, selecting a target key point from a plurality of key points of each of two human hands if it is determined that the video frame contains the two human hands.

8. An electronic apparatus, comprising:
    one or more processors; and
    at least one memory for storing one or more programs, wherein when executed by the one or more processors, the one or more programs cause the apparatus to:
        acquire a video frame containing a human hand, and detecting key points of the human hand contained in the video frame;

generate a special effect of the human hand based on the key points, wherein the special effect comprises a linear pattern, and wherein the one or more programs upon execution by the one or more processors further cause the apparatus to:
  determine a position of at least one endpoint of the linear pattern based on positions of the key points,
  generate the linear pattern based on the position of the at least one endpoint,
  wherein the determining a position of at least one endpoint of the linear pattern based on positions of the key points further comprises: determining, in response to a determination that one finger of the human hand points to a preset directions, a position of one endpoint of a trunk line of the linear pattern based on a position of a fingerprint key point of the finger, and
  wherein the generating the linear pattern based on the position of the at least one endpoint further comprises: generating the trunk line based on the position of the one endpoint, wherein a difference between a direction of the trunk line and the preset direction is in a preset angle range; and
  display the generated special effect in a picture of the video frame.

9. The apparatus according to claim 8, wherein the at least one memory further storing programs that upon execution by the at least one processor cause the apparatus to:
  generate an additional line with at least one endpoint located in the trunk line.

10. The apparatus according to claim 8, wherein the at least one memory further storing programs that upon execution by the at least one processor cause the apparatus to:
  in response to the determination that one finger of the human hand points to the preset direction, determine whether the finger is bent; and
  in response to a determination that the finger is not bent, determine a position of one endpoint of a trunk line of the linear pattern based on a position of a fingertip key point of the finger.

11. The apparatus according to claim 8, wherein
  the linear pattern comprises at least one target line;
  the at least one memory further storing programs that upon execution by the at least one processor cause the apparatus to: in response to a determination that the video frame contains two human hands, select a target key point from key points of each of the two human hands, and determine a position of a target endpoint of the at least one target line based on a position of the selected target key point; and
  the at least one memory further storing programs that upon execution by the at least one processor cause the apparatus to: generate the at least one target line whose endpoint is the target endpoint according to the position of the target endpoint, wherein the at least one target line is located in an area between the two human hands.

12. The apparatus according to claim 11, wherein the at least one target line comprises a plurality of target lines, and the plurality of target lines intersect each other.

13. The apparatus according to claim 11, wherein the at least one memory further storing programs that upon execution by the at least one processor cause the apparatus to:
  in response to a determination that no finger points to a preset direction, select a target key point from a plurality of key points of each of two human hands if it is determined that the video frame contains the two human hands.

14. The apparatus according to claim 11, wherein the at least one memory further storing programs that upon execution by the at least one processor cause the apparatus to:
  in response to a determination that there is one finger pointing to a preset direction, determine whether the finger pointing to the preset direction is bent; and
  in response to determining that the finger pointing to the preset direction is bent, select a target key point from a plurality of key points of each of two human hands if it is determined that the video frame contains the two human hands.

15. A non-transitory computer-readable storage medium having a computer program stored thereon, wherein the program upon execution by a processor causes the processor at least to:
  acquire a video frame containing a human hand, and detecting key points of the human hand contained in the video frame;
  generate a special effect of the human hand based on the key points, wherein the special effect comprises a linear pattern, and wherein the program upon execution by the processor further causes the processor to:
    determine a position of at least one endpoint of the linear pattern based on positions of the key points,
    generate the linear pattern based on the position of the at least one endpoint,
    wherein the determining a position of at least one endpoint of the linear pattern based on positions of the key points further comprises: determining, in response to a determination that one finger of the human hand points to a preset directions, a position of one endpoint of a trunk line of the linear pattern based on a position of a fingerprint key point of the finger, and
    wherein the generating the linear pattern based on the position of the at least one endpoint further comprises: generating the trunk line based on the position of the one endpoint, wherein a difference between a direction of the trunk line and the preset direction is in a preset angle range; and
    display the generated special effect in a picture of the video frame.

* * * * *